United States Patent [19]

Takizawa et al.

[11] Patent Number: 4,629,212
[45] Date of Patent: Dec. 16, 1986

[54] VEHICLE SUSPENSION APPARATUS

[75] Inventors: Shozo Takizawa; Minoru Tatemoto; Akio Furumura; Tadashi Sugawara, all of Okazaki; Shigeo Kariya, Nagoya; Kazuo Hiroshima, Okazaki, all of Japan

[73] Assignee: Mitsubishi Jidosha Kogyo Kabushiki Kaisha, Tokyo, Japan

[21] Appl. No.: 747,108

[22] Filed: Jun. 20, 1985

[30] Foreign Application Priority Data

Jun. 26, 1984 [JP] Japan .................................. 59-94570

[51] Int. Cl.⁴ .............................................. B60G 11/26
[52] U.S. Cl. ..................................... 280/707; 364/424
[58] Field of Search ..................... 280/707, 703, 714; 180/41; 267/64.16, 64.25; 364/424

[56] References Cited

U.S. PATENT DOCUMENTS 3,603,612 9/1971 Hill et al. ............................. 280/707
4,564,215 1/1986 Kumagai et al. .................... 280/707

FOREIGN PATENT DOCUMENTS 53-26021 8/1978 Japan .
59-75812 4/1984 Japan .
1267815 3/1972 United Kingdom .

Primary Examiner—John J. Love
Assistant Examiner—Ross Weaver
Attorney, Agent, or Firm—Frishauf, Holtz, Goodman & Woodward

[57] ABSTRACT

A vehicle suspension apparatus has a hard/soft switching unit for switching suspension units between a hard state and a soft state, a vehicle velocity sensor for detecting a vehicle's velocity, and control means for receiving a signal from the vehicle velocity sensor and controlling the hard/soft switching unit for holding the suspension units in the soft state when the vehicle's velocity detected by the vehicle velocity sensor is smaller than a switching velocity as a first preset velocity set by the hard/soft switching unit and in the hard state when the vehicle's velocity detected by the vehicle velocity sensor exceeds the switching velocity. The vehicle suspension apparatus further has a switching velocity preset switch for presetting the switching velocity. The control means controls the hard/soft switching unit so as to set the suspension units in the hard state and to store the vehicle's velocity detected by the vehicle velocity sensor as a subsequent switching velocity when the switching velocity preset switch is operated while the vehicle's velocity detected by the vehicle velocity sensor falls between the first preset velocity and a second preset velocity lower than the first preset velocity and the suspension units are set in the soft state.

13 Claims, 6 Drawing Figures

VEHICLE SUSPENSION APPARATUS

BACKGROUND OF THE INVENTION

The present invention relates to a vehicle suspension apparatus wherein suspension units are held in a soft state during normal driving and are automatically switched to a hard state during high-speed driving, thereby improving driving stability.

In a conventional vehicle suspension apparatus of this type, the velocity detected by a vehicle velocity sensor is compared with a preset switching velocity. When the detected velocity is lower than the switching velocity, the suspension units are held in the soft state. When the detected velocity is equal to or larger than the switching velocity, the suspension units are held in the hard state.

However, when the vehicle is affected by cross winds during travel or when it travels along a rough road, the suspension units are preferably held in the hard state to provide better driving stability even if the actual vehicle velocity is lower than the switching velocity. In the case when a cross wind is light or a road surface is smooth, factors affecting driving stability decrease and even if the vehicle travels at a velocity higher than the switching velocity, the vehicle is preferably held in the soft state to improve riding comfort.

SUMMARY OF THE INVENTION

It is, therefore, an object of the present invention to provide a vehicle suspension apparatus for automatically making suspension units soft or hard in accordance with the vehicle's velocity, wherein the switching velocity at which the suspension units are switched from the soft state to the hard state or vice versa can be arbitrarily set.

According to the present invention, there is provided a vehicle suspension apparatus comprising: a hard/soft switching unit for switching suspension units between a hard state and a soft state; a vehicle velocity sensor for detecting a vehicle's velocity; and control means for receiving a signal from the vehicle velocity sensor and controlling the hard/soft switching unit for holding the suspension units in the soft state when the vehicle's velocity detected by the vehicle velocity sensor is smaller than a switching velocity as a first preset velocity set by the hard/soft switching unit and in the hard state when the vehicle's velocity detected by the vehicle velocity sensor exceeds the switching velocity, the vehicle suspension apparatus further comprising a switching velocity preset switch for presetting the switching velocity, and the control means being arranged to control the hard/soft switching unit so as to set the suspension units in the hard state and to store the vehicle's velocity detected by the vehicle velocity sensor as a subsequent switching velocity when the switching velocity preset switch is operated while the vehicle's velocity detected by the vehicle velocity sensor falls between the first preset velocity and a second preset velocity lower than the first preset velocity and the suspension units are set in the soft state.

DETAILED DESCRIPTION OF THE PREFERRED EMBODIMENTS

The present invention will be described in detail with reference to the accompanying drawings.

FIGS. 1 to 4 show a first embodiment of the present invention.

Figure 1:
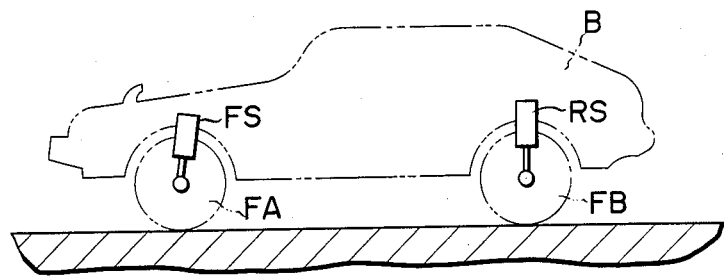
FIG. 1 is a representation showing a vehicle equipped with a suspension apparatus according to the present invention.

In FIG. 1, reference character B denotes a vehicle body; FA, front wheels; and FB, rear wheels. Front suspension units FS (FS1, FS2) are interposed between the body B and the front wheels FA, and rear suspension units RS (RS1, RS2) are interposed between the body B and the rear wheels FB. In FIG. 2A, the unit FS1 is a front left wheel suspension unit; FS2, a front right wheel suspension unit; RS1, a rear left wheel suspension unit; and RS2, a rear right wheel suspension unit. The units FS1, FS2, RS1 and RS2 have an identical structure and are exemplified by the suspension unit S except when the units for the front and rear or right and left wheels are described distinctly, and only a necessary portion for controlling the vehicle height will be shown.

Figure 2B:
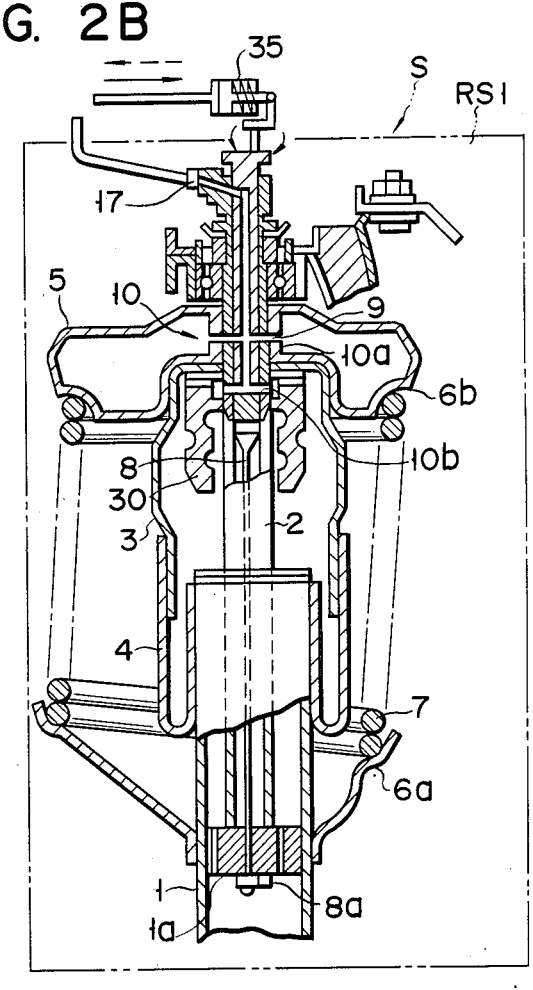
FIGS. 2A and 2B are diagrams showing the overall construction of the suspension apparatus of FIG. 1.
Figure 2A:
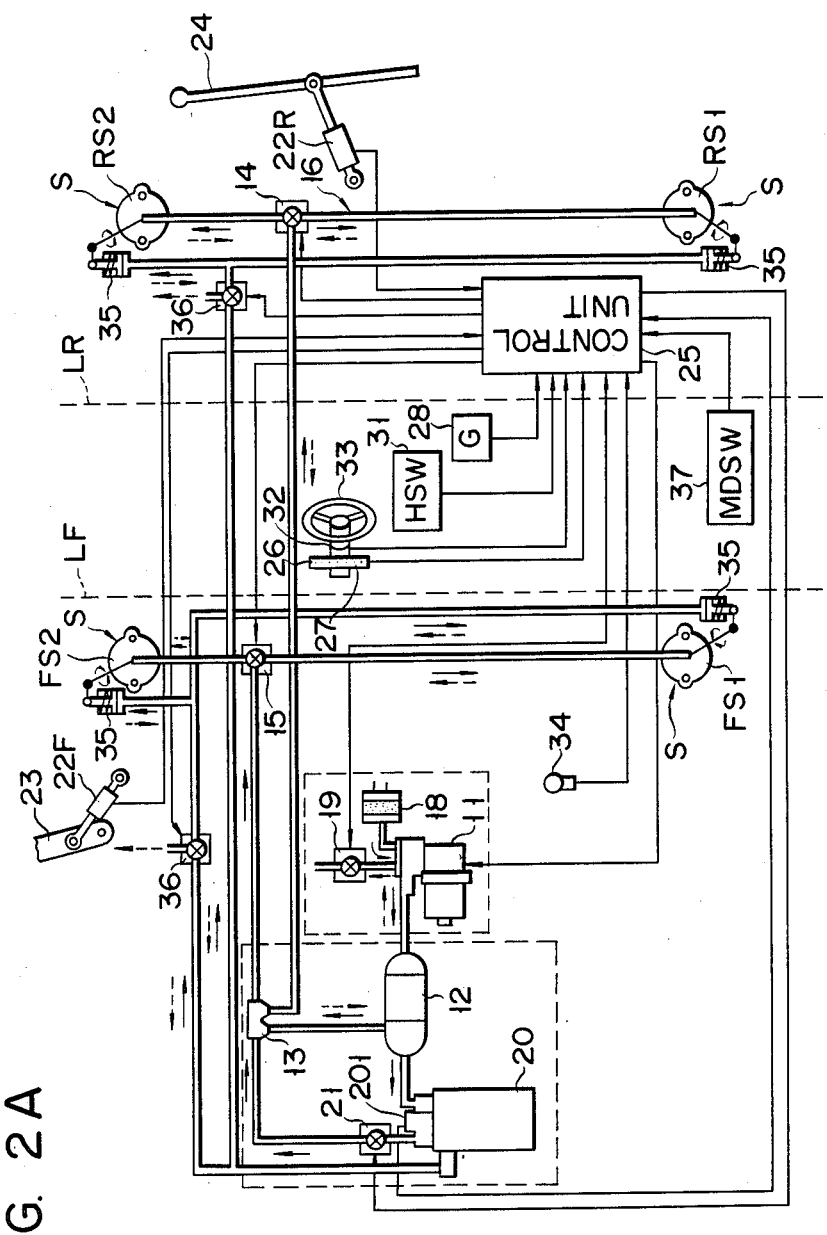

In FIG. 2B, the suspension unit S comprises a strut type attenuation switching shock absorber 1. The shock absorber 1 has a cylinder mounted at the wheel side, a piston 1a slidably telescoped into the cylinder, and a piston rod 2 supported at its upper end to the body B. The shock absorber provides a damping function in response to the position of a control valve 8a to be described in detail later when the cylinder elevationally moves to the piston rod 2 in response to the elevational movements of the wheels.

The suspension unit S further comprises a main air spring chamber 3 which has a function of controlling the vehicle's height coaxially with the piston rod 2 at the top of the shock absorber 1. The main air spring chamber 3 is partly formed of a bellows 4 to raise or lower the vehicle by supplying or exhausting air to or from the air spring chamber 3. An auxiliary air spring chamber 5 is provided coaxially with the piston rod 2 immediately above the main air spring chamber 3.

A spring retainer 6a directed upward is provided on the outer wall of the cylinder of the shock absorber 1, and a spring retainer 6b directed downward is provided on the outer wall of the auxiliary air spring chamber 5. A coiled spring 7 is contracted between both spring retainers 6a and 6b. The coiled spring 7 supports part of the weight of the body B.

The air spring chambers 3 and 5 communicate with each other through a communicating path 9 perforated in the control rod 8 rotatably inserted into the piston rod 2, and an opening and closing valve 10 having a spring constant switching function is provided in the path 9. The valve 10 has a first valve portion 10a which controls communication/noncommunication between the chamber 10 and the path 9, and a second valve portion 10b which controls communication/noncommunication between the chamber 3 and the path 9. In the open mode of the valve 10, the chamber 3 and the chamber 5 communicate with each other, thereby decreasing the spring constant. In the closed mode of the valve 10, the chamber 3 and the chamber 5 are closed, thereby increasing the spring constant. In other words, the volume of the spring chamber can be varied by opening or closing the valve 10 by turning the control rod 8 to change the spring constant of the suspension.

The control valve 8a which can open and close one of two through holes in the piston 1a of the shock absorber 1 is provided at the lower end of the rod 8. The valve 8a opens the through hole in the piston 1a which it controls when the valve 10 is in the open mode by the rod 8 to reduce an attenuating force, and closes said through hole in the piston 1a when the valve 10 is in the closed mode to increase the attenuating force.

A circuit for supplying and exhausting air to and from the air spring chamber 3 of the suspension unit S will now be described in detail. Compressed air for controlling the vehicle's height is supplied to the respective suspension units S from a compressor 11 through; a drier 12, a joint 13, a rear solenoid valve 14 or a front solenoid valve 15, a pipe 16 for connecting them, and a communicating port 17 communicated with the path 9 in the, partly pipe like, control rod 8 connecting them.

The compressor 11 compresses atmospheric air intaken from an air cleaner 18 and supplies the compressed air to the drier 12. The compressed air dried by silica gel from the drier 12 is supplied to the respective suspension units S as denoted by arrows with solid lines of FIGS. 2A and 2B. When the compressed air is exhausted from the respective suspension units S, the compressed air is exhausted into the atmosphere through an exhaust solenoid valve 19 as denoted by arrows with broken lines of FIGS. 2A and 2B.

A reserve tank 20 is connected to the drier 12, and a part of the compressed air is supplied from the tank 20, through an air supply solenoid valve 21, to the respective suspension units S.

Reference numeral 22F denotes a front vehicle height sensor for detecting the front vehicle height of a vehicle mounted on a lower arm 23 of the front right suspension of the vehicle; and 22R, a rear vehicle height sensor for detecting the rear vehicle height of the vehicle mounted on a lateral rod 23 of the rear left suspension of the vehicle. A front vehicle height detection signal and a rear vehicle height detection signal from the sensors 22F and 22R are supplied to a control unit 25 having a microcomputer as a vehicle height controller.

Each of these sensors 22F and 22R comprises a Hall IC element and a magnet, one of which is mounted on the wheel side and the other of which is mounted on the body side so as to detect the distance between the current level and a normal, high or low vehicle height level. More particularly, the sensors output a vehicle height detection signal N in the case of the normal vehicle height, L in the case of the low vehicle height level, H in the case of the high vehicle height level, LL in the case where the vehicle's height is lower than the low level, NL in the case where the vehicle's height is between the low level and the normal vehicle height level, NH in the case where the vehicle's height is between the normal level and the high vehicle height level, and HH in the case where the vehicle's height is higher than the high vehicle height level. Both vehicle height sensors may be of another type such as, for example, that employing a phototransistor.

Reference numeral 27 denotes a vehicle velocity sensor contained in a speedometer 26. The sensor 27 supplies a detected vehicle speed signal to a control unit 25. The sensor 27 may use a sensor of a lead switching type in a mechanical speedometer and an open collector outputting type by a transistor in an electronic speedometer.

Reference numeral 28 denotes an acceleration sensor (G sensor) for detecting the acceleration operated on the vehicle body. The sensor 28 serves to detect the forward or backward, leftward or rightward and upward or downward acceleration of the sprung mass of the suspension of the vehicle, i.e., of the vehicle body. When there is no acceleration, a light from a light emitting diode is shielded by a shielding plate which cooperates with suspended weight and does not reach a photodiode, thus detecting that the vehicle is not accelerating. When an acceleration higher than the set value acts on the vehicle body, the weight is inclined which allows the light to reach the photodiode, thereby detecting the acceleration. A signal of the sensor 28 is supplied to the control unit 25.

Reference numeral 32 denotes a steering sensor for detecting the rotating velocity of the steering wheel 33, i.e., the steering angular velocity. Reference numeral 34 denotes an accelerator sensor for detecting the velocity with which an accelerator pedal of a vehicle (not shown) is depressed. The detection signals of the sensors 32 and 34 are supplied to the control unit 25.

Reference numeral 35 denotes a pneumatic drive mechanism provided at each suspension unit S for rotating the control rod 8 through the communication of a 3-way directional valve 36. The valve 36 can select any first position for communication between the pneumatic drive mechanism 35 and the atmosphere and a second position for communication between the pneumatic drive mechanism 35 and the reserve tank 20 by a control signal from the control unit 25, thereby allowing the drive mechanism 35 to control the rotation of the control rod 8. The drive mechanism 35 holds the control rod 8 at a soft position for holding the spring constant and the attenuating force of the suspension unit S is small when the valve 36 is disposed at the first position and holds the control rod 8 at the hard position for holding the spring constant and the attenuating force of the suspension unit S when the valve 36 is disposed at the second position. The pneumatic drive mechanism 35 is always energized by the spring to the first position.

A solenoid type drive mechanism may be used instead of the pneumatic drive mechanism 35.

Reference numeral LF denotes a boundary between an engine room (left side from a broken line LF of the drawing) and a compartment chamber (between broken lines LF and LR); and LR, a boundary between the compartment chamber and a trunk room (right side from a broken line LR).

Reference numeral 30 denotes a bump stopper for preventing damage of the wall surface of the main air spring chamber 3 when the cylinder of the shock absorber 1 is largely raised on a rough road.

Reference numeral 31 denotes a mode selection switch (HSW) as a high vehicle height selection switch. This switch 31 serves to select an AUTO mode for automatically controlling the vehicle height according to the traveling state of the vehicle to any of the normal vehicle height, the low vehicle height and the high vehicle height, and a HIGH mode for controlling the vehicle height to the high vehicle height to be described in detail later.

Reference numeral 37 denotes a mode selection switch (MDSW) for setting a control mode of spring constants and damping forces of the respective units S in the unit 25. The switch 37 can automatically set the units S to the soft state for keeping the suspension soft, or to the hard state for keeping the suspension hard.

The switch 37 comprises a normally open switch which is closed only when operated by a passenger. An output signal from the switch 37 is supplied to the unit 25.

The operation of the vehicle suspension apparatus having the construction described above will be described hereinafter.

Figure 3:
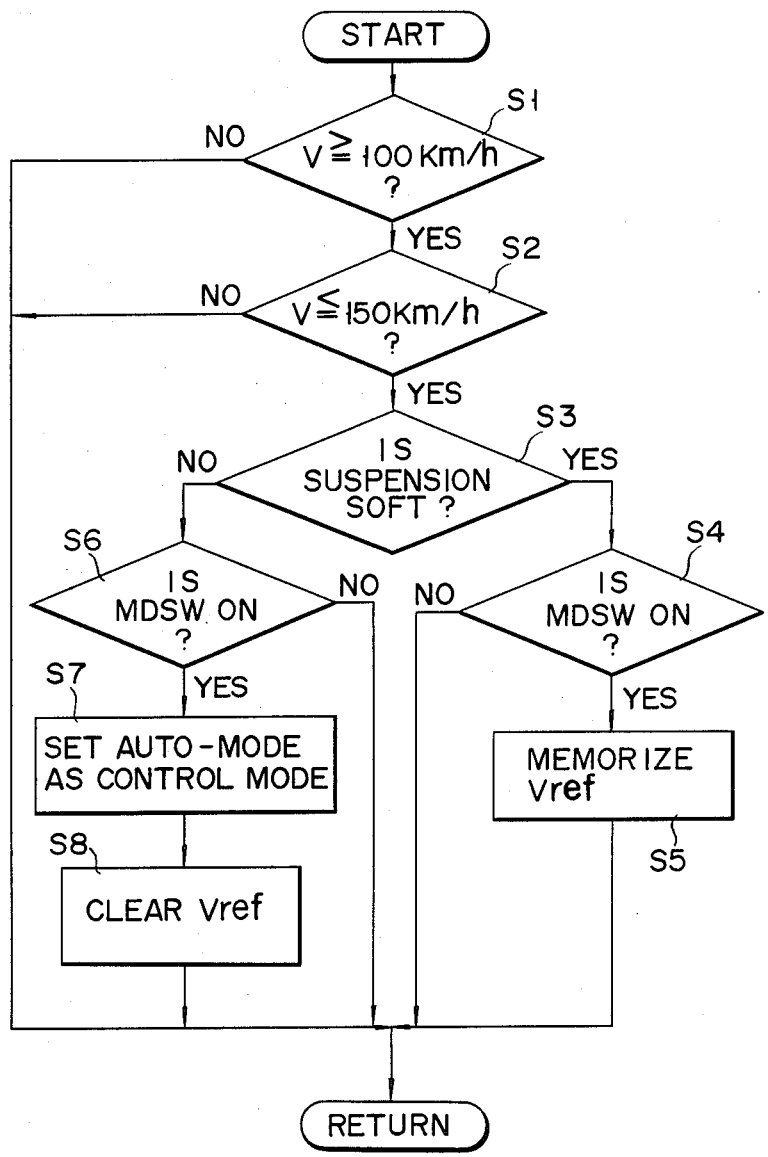
FIGS. 3 and 4 are respectively flow charts for explaining a first embodiment of the present invention.

When the auto mode is set in the unit 25 as the control mode by the switch 37, the unit 25 performs the operation in accordance with the flow chart of FIG. 3.

The unit 25 checks in step S1 whether or not a velocity V detected by the sensor 27 exceeds 100 km/h. If YES in step S1, the flow advances to step S2 to check whether or not the velocity V is equal to or less than 150 km/h. If YES in step S2, the flow advances to step S3 and the unit 25 checks whether or not the respective units S are set in the soft state. More specifically, the unit 25 supplies a control signal through the valve 36 to cause the mechanism 35 to communicate with the tank 20, and the unit 25 checks whether or not the rod 8 is located in the soft position for keeping the units S in the soft state. If YES in step S3, the flow advances to step S4. The unit 25 checks in step S4 whether or not the switch 37 is turned on. If YES in step S4, the flow advances to step S5 to store a switching velocity Vref (i.e., a velocity at which the units S are switched from the soft state to the hard state) in the unit 25.

However, if NO in step S3, the flow advances to step S6 to cause the unit 25 to check whether or not the switch 37 is turned on. If YES in step S6, the flow advances to step S7 to set the AUTO mode wherein the soft/hard state of the units S is automatically switched in accordance with the vehicle's velocity. In step S8, the switching velocity Vref stored in step S5 is cleared. In other words, when the switch 37 is turned on while the detected velocity falls within the range between 100 km/h and 150 km/h and the suspension units S are held in the soft state, the AUTO mode is set to automatically switch between the hard and soft states of the units S. At the same time, the switching velocity Vref stored in the unit 25 is cleared.

Figure 4:
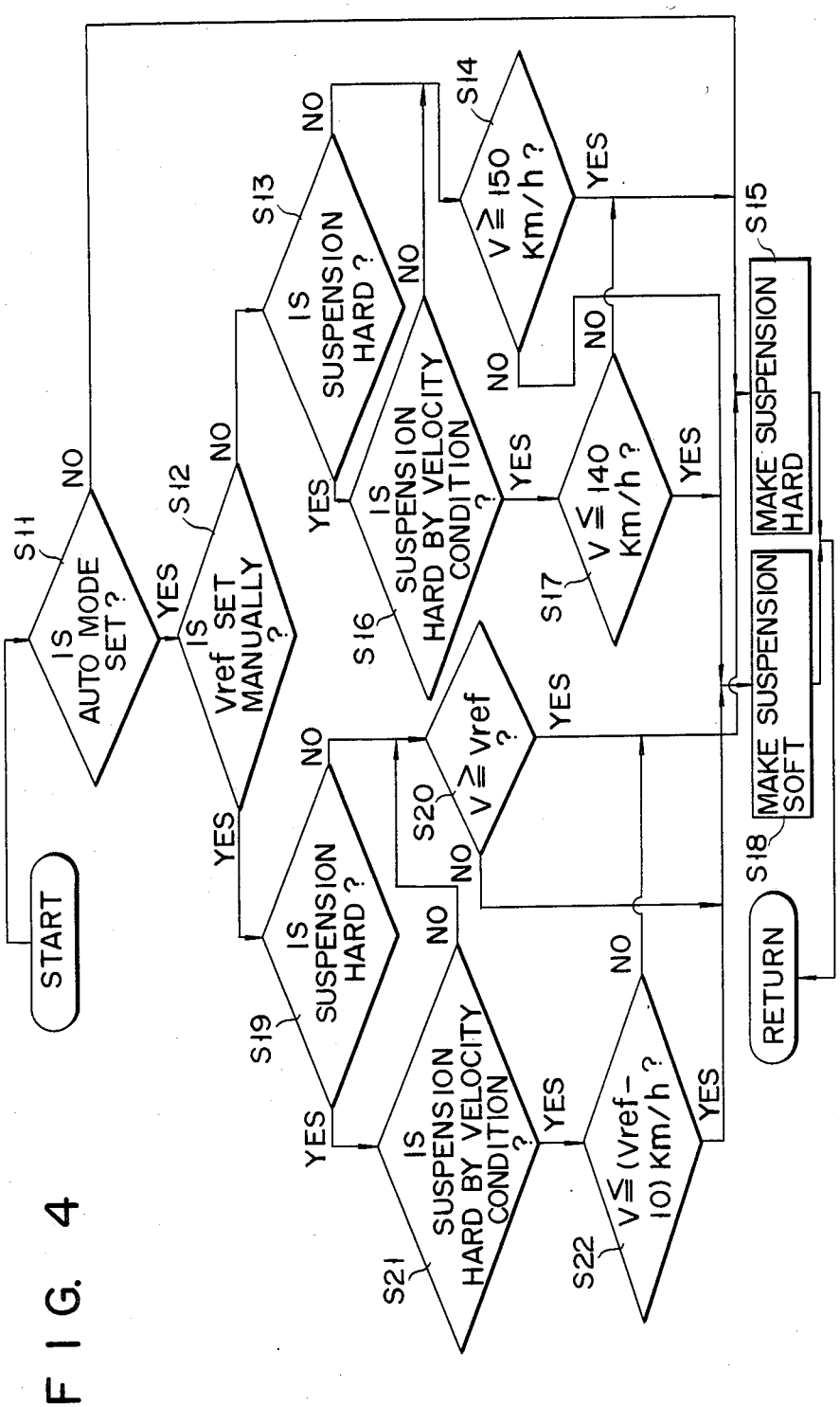

The unit 25 then performs the operation for switching between the hard and soft states of the units S in accordance with the flow chart of FIG. 4.

The unit 25 checks in step S11 whether or not the AUTO mode is set. If YES in step S11, the flow advances to step S12 to check whether or not the switching velocity Vref is manually set. In other words, the unit 25 checks in step S12 whether or not the switching velocity Vref was set in step S5. If NO in step S12, the flow advances to step S13 to check whether or not the units S are set in the hard state. If NO in step S13, the flow advances to step S14 to check whether or not the velocity V detected by the sensor 27 exceeds 150 km/h. If NO in step S14, the flow advances to step S15 to set the units S to the hard state. In step S15, the unit 25 controls the valve 36 to set the units S to the hard state.

However, if YES in step S13, the flow advances to step S16 to check whether or not the units S are set to the hard state in accordance with velocity comparison. In other words, the unit 25 checks in step S16 whether or not the units S are set to the hard state which would occur if the result is judged to be YES in step S14. If YES in step S16, the flow advances to step S17 to check whether or not the velocity detected by the sensor 27 is equal to or less than 140 km/h. If YES in step S17, the units S are set to the soft state in step S18. However, if NO in step S17, the flow advances to step S15 to keep the units S in the hard state.

When the switching velocity Vref is not set in step S5, the unit 25 sets the units S to the hard state when the velocity V exceeds 150 km/h. However, when the units S are already set in the hard state, the units S are switched to the soft state upon a decrease in velocity V below 140 km/h.

If YES in step S12, the flow advances to step S19 to check whether or not the units S are set in the hard state. If NO in step S19, the flow advances to step S20 to check whether or not the velocity V detected by the sensor 27 exceeds the switching velocity Vref. If YES in step S20, the flow advances to step S15 to set the units S to the hard state. However, if NO in step S20, the flow advances to step S18 to keep the units S in the soft state.

If YES in step S19, the flow advances to step S21 to check whether or not the units S are set in the hard state in accordance with the velocity comparison. The unit 25 checks in step S21 whether or not the units S were set to the hard state in step S15 through judging YES in step S20. If YES in step S21, the flow advances to step S22 to check whether or not the velocity V detected by the sensor 27 is equal to or less than (switching velocity Vref−10 km/h). If YES in step S22, the flow advances to step S18 to switch the units S to the soft state. However, if NO in step S22, the flow advances to step S15 to keep the units S in the hard state.

As above-mentioned, in the case that the switching velocity Vref is set in step S5, the units S are switched to the hard state when the detected velocity exceeds the switching velocity. When the units S are already set in the hard state, the units S are switched to the soft state upon a decrease in velocity V below (switching velocity Vref−10 km/h).

According to the first embodiment described above, the switching velocity Vref as a reference velocity for switching the units S between the hard and soft states can be optionally set. When a cross wind is strong or a road surface is rough and stable driving cannot be assured unless the suspensions are set in the hard state even at a relatively low velocity, the switching velocity Vref is set relatively low, and the unit 25 sets the units S to the hard state even at the relatively low velocity, thereby improving driving stability. However, when a cross wind is light or a road surface is smooth and good driving stability can be assured even if the units S are set to the soft state at a relatively high velocity, the switching velocity Vref is set to be high. In this case, the control unit 25 sets the units S in the soft state while the velocity V is lower than the relatively high switching velocity Vref, thereby guaranteeing good riding comfort up to a relatively high velocity.

As is apparent from step S17 or S22, when the velocity V has already exceeded the switching velocity Vref and the units S are set in the hard state, the units S are switched to the soft state only when the velocity V is lower by 10 km/h than the switching velocity Vref. For example, when the vehicle travels at a velocity V near the switching velocity Vref, a hunching phenomenon which causes the unit 25 to repeatedly switch the units S between the soft state and the hard state can be greatly reduced.

When the hard mode is set in the unit 25 as the control mode by the switch 37, the units S can be kept in the hard state irrespective of an increase/decrease in velocity. This mode can be conveniently used when the vehicle travels through continuous hairpin curves or along a rough road.

The switch 37 also serves as a switch for setting the switching velocity Vref, so that the total number of switches can be decreased.

A switch for setting the switching velocity Vref can be provided separately from the mode selection switch.

A second embodiment of the present invention will be described with reference to FIG. 5.

Figure 5:
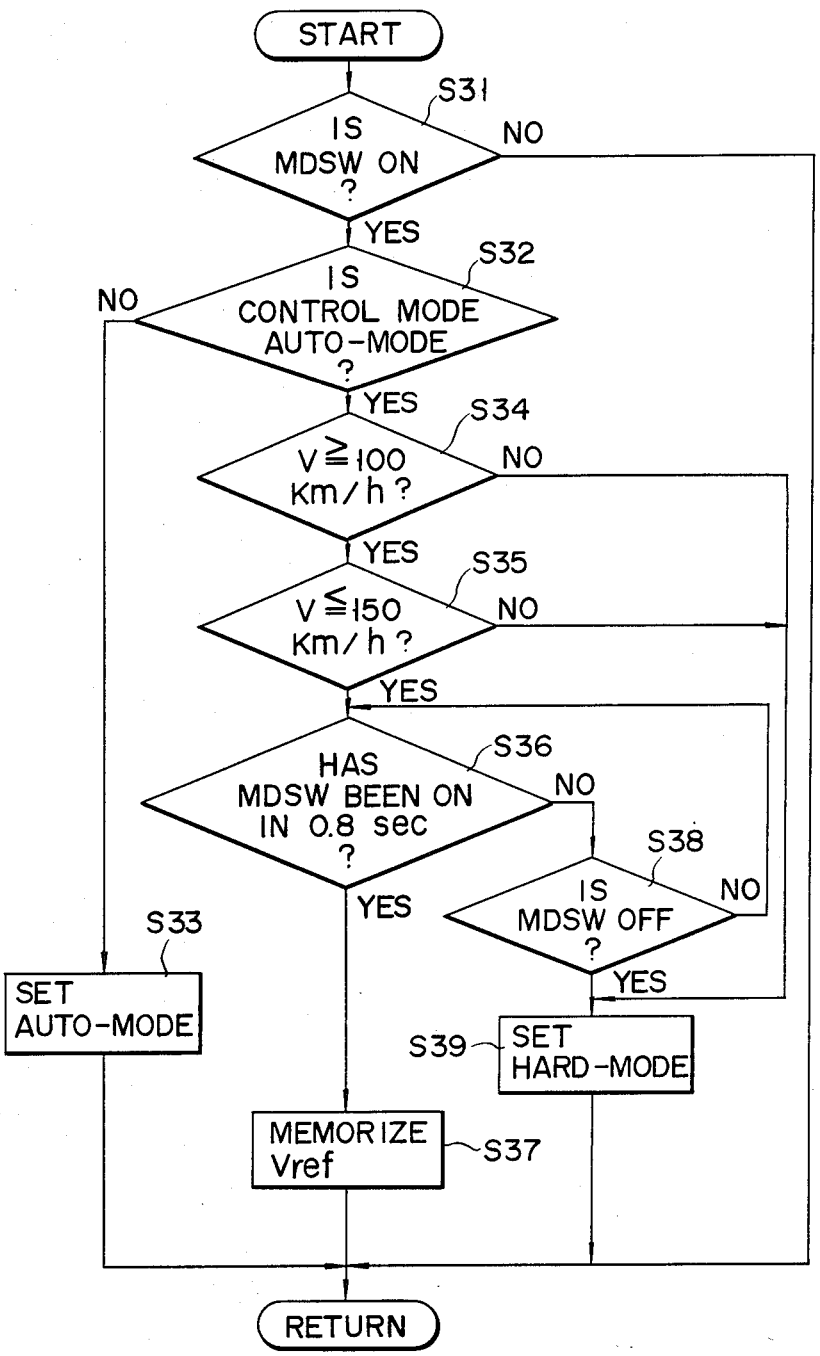
FIG. 5 is a flow chart for explaining a second embodiment of the present invention.

The second embodiment employs the flow chart of FIG. 5 instead of the flow chart of FIG. 3 of the first embodiment.

The control unit 25 performs the operation in accordance with the flow chart of FIG. 5.

The unit 25 checks in step S31 whether or not the switch (MDSW) 37 is turned on. If YES in step S31, the flow advances to step S32 to check whether or not the control mode in the unit 25 is set in the AUTO mode. If NO in step S32, the flow advances to step S33, and the control mode in the unit 25 is set in the AUTO mode.

However, if YES in step S32, the flow advances to step S34 to check whether or not the velocity V detected by the sensor 27 exceeds 100 km/h. If YES in step S34, the flow advances to step S35 to check whether or not the velocity V is equal to or less than 150 km/h. If YES in step S35, the flow advances to step S36 to check whether or not the ON state of the switch 37 is kept for 0.8 seconds. If YES in step S36, the flow advances to step S37, and the velocity V detected upon the operation of the switch 37 is stored as the switching velocity Vref in the unit 25.

However, if NO in step S36, the flow advances to step S38 to check whether or not the switch 37 is turned off. If YES in step S38, the flow advances to step S39, and the hard mode is set as the control mode in the unit 25.

In other words, when the switch 37 is operated by the passenger for 0.8 seconds or longer while the AUTO mode is set as the control mode in the control unit 25 and the velocity falls between 100 km/h and 150 km/h, the detected velocity is stored as the switching velocity Vref in the unit 25. However, when the ON time of the switch 37 operated by the passenger is less than 0.8 seconds, the hard mode is set as the control mode in the unit 25 in step S39.

According to the second embodiment, the same effect as in the first embodiment is obtained. In addition, the following effect can also be obtained.

When the ON time of the switch 37 exceeds the predetermined period of time (0.8 seconds), the signal from the switch 37 is processed as a signal for setting the switching velocity. However, when the ON time falls within the predetermined period of time, the signal from the switch 37 serves as a signal for setting the control mode. Therefore, although the switch 37 also serves as a switch for setting the switching velocity, the passenger can change the ON time of the switch 37. In this manner, the switch 37 can be used to change the control mode as well as to set the switching velocity.

What is claimed is:

1. A vehicle suspension apparatus comprising:
   a hard/soft switching unit for switching suspension units between a hard state and a soft state;
   a vehicle velocity sensor for detecting a vehicle's velocity;
   a switching velocity preset switch for presetting the switching velocity; and
   control means for controlling said hard/soft switching unit so as to set said suspension units in the hard state and to store the vehicle's velocity detected by said vehicle velocity sensor as a subsequent switching velocity when said switching velocity preset switch is operated while said vehicle's velocity, detected by said vehicle velocity sensor, falls between the first preset velocity and a second preset velocity lower than the first preset velocity and said suspension units are set in the soft state.

2. An apparatus according to claim 1, wherein said control means controls said hard/soft switching unit to set said suspension units in the soft state when said suspension units are set in the hard state and the velocity detected by said vehicle velocity sensor is equal to or lower than the switching velocity by a predetermined value.

3. An apparatus according to claim 1, wherein said control means further comprises a mode selection switch for setting as a control mode one of; a hard mode for holding said suspension units in the hard state irrespective of an increase/decrease in velocity detected by said vehicle velocity sensor, and an auto mode for automatically switching said suspension units between the hard state and the soft state in accordance with the velocity detected by said vehicle velocity sensor, and said control means holds said suspension units in the hard state when said mode selection switch sets the hard mode.

4. An apparatus according to claim 3, wherein said mode selection switch also serves as said switching velocity preset switch.

5. An apparatus according to claim 3, wherein said mode selection switch comprises a normally open switch, and said control means sets said suspension units in the hard mode when said mode selection switch is turned on while the auto mode is already set, and the auto mode when the mode selection switch is turned on while the hard mode is already set.

6. An apparatus according to claim 5, wherein said mode selection switch also serves as said switching velocity preset switch, said control means controls said hard/soft switching unit to switch said suspension units to the hard state and stores as a subsequent switching velocity the velocity detected by said vehicle velocity sensor when said mode selection switch is turned on while the velocity detected by said vehicle velocity sensor falls within the range between the first preset velocity and the second preset velocity and said suspension units are set in the soft state, and said control means controls said hard/soft switching unit to set said suspension units in the auto mode and clears the stored switching velocity when said mode selection switch is turned on while the velocity detected by said vehicle velocity sensor falls within the range between the first preset velocity and the second preset velocity and said suspension units are set in the hard state.

7. An apparatus according to claim 5, wherein said mode selection switch also serves as said switching velocity preset switch, said control means controls said hard/soft switching unit to set said suspension units in the hard state and stores as a subsequent switching velocity, the velocity detected by said vehicle velocity sensor when said mode selection switch is operated for longer than a predetermined period of time while the velocity detected by said vehicle velocity sensor falls within the range between the first preset velocity and the second preset velocity and the auto mode is set, and said control means controls said hard/soft switching unit to set said suspension units in the hard mode when said mode selection switch is turned on for a period of time shorter than the predetermined period of time while the velocity detected by said vehicle velocity sensor falls within the range between the first preset velocity and the second preset velocity and the auto mode is set.

8. An apparatus according to claim 1, wherein said hard/soft switching unit changes spring constants of said suspension units.

9. An apparatus according to claim 1, wherein said hard/soft switching unit changes damping forces of said suspension units.

10. An apparatus according to claim 1, wherein said hard/soft switching unit changes the spring and damping forces of said suspension units.

11. An apparatus according to claim 1, wherein said control means sets as the switching velocity a third preset velocity falling within the range between the first preset velocity and the second preset velocity when the switching velocity is not set by said switching velocity preset switch.

12. An apparatus according to claim 11, wherein the third preset velocity comprises the first preset velocity.

13. An apparatus according to claim 11, wherein the third preset velocity comprises the second preset velocity.

* * * * *